United States Patent Office 3,094,230
Patented June 18, 1963

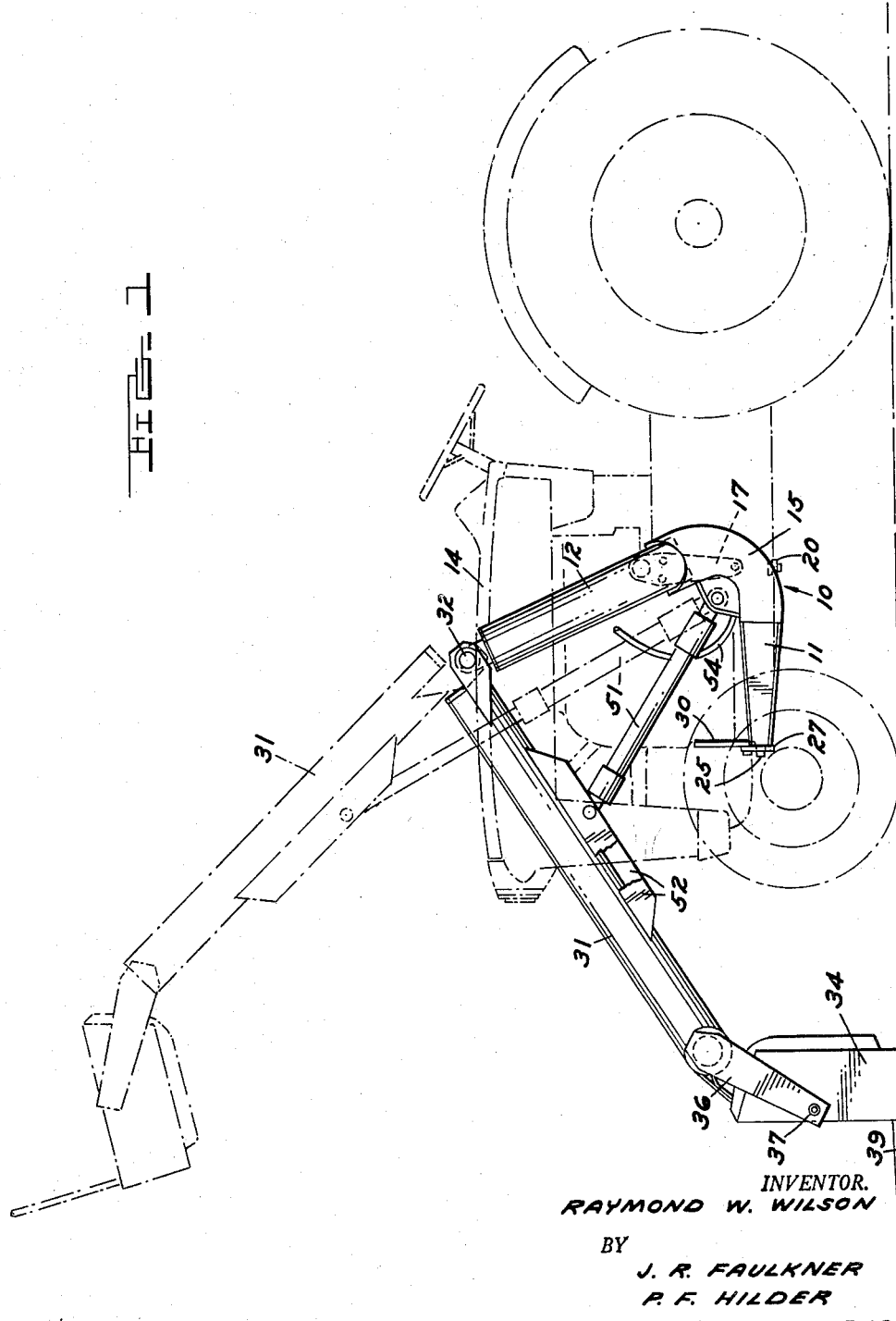

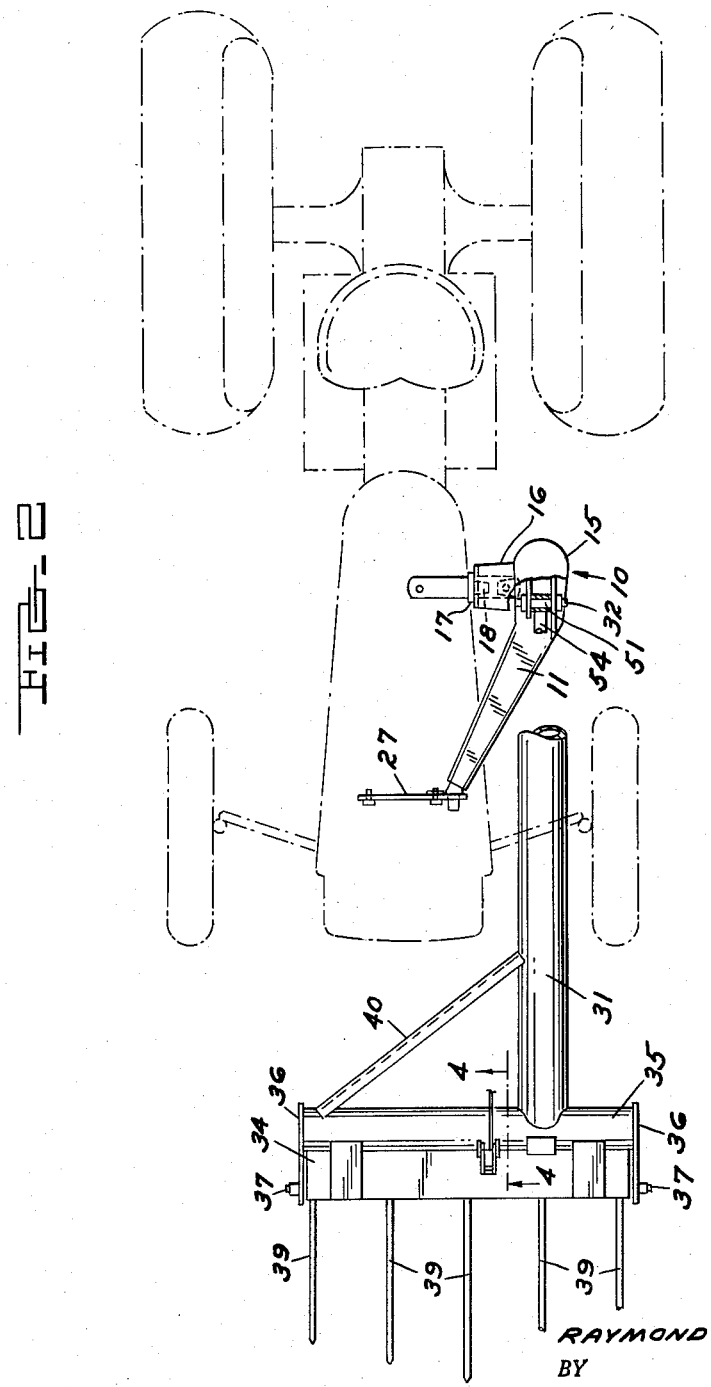

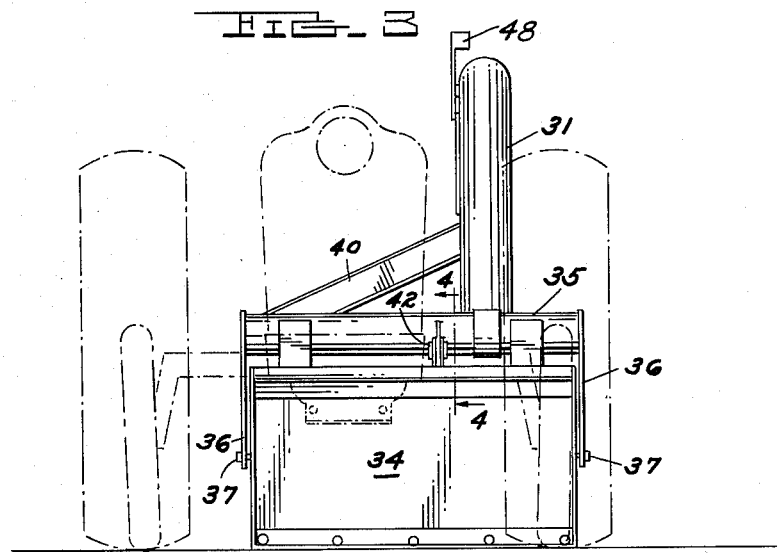
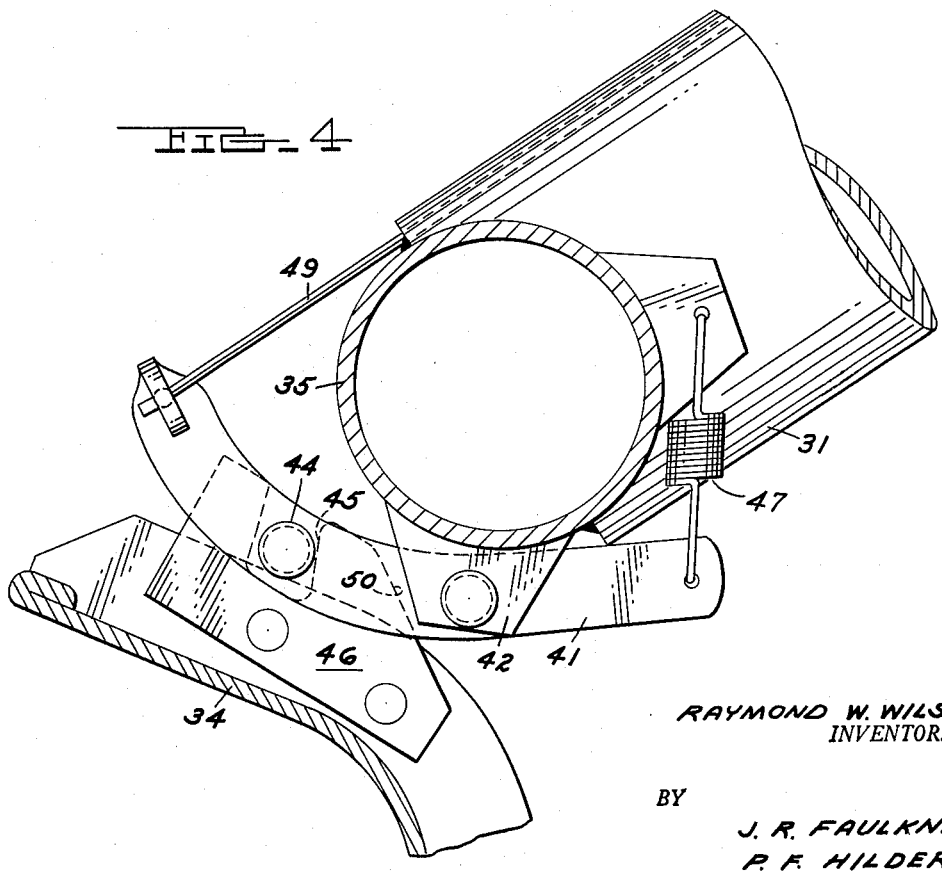

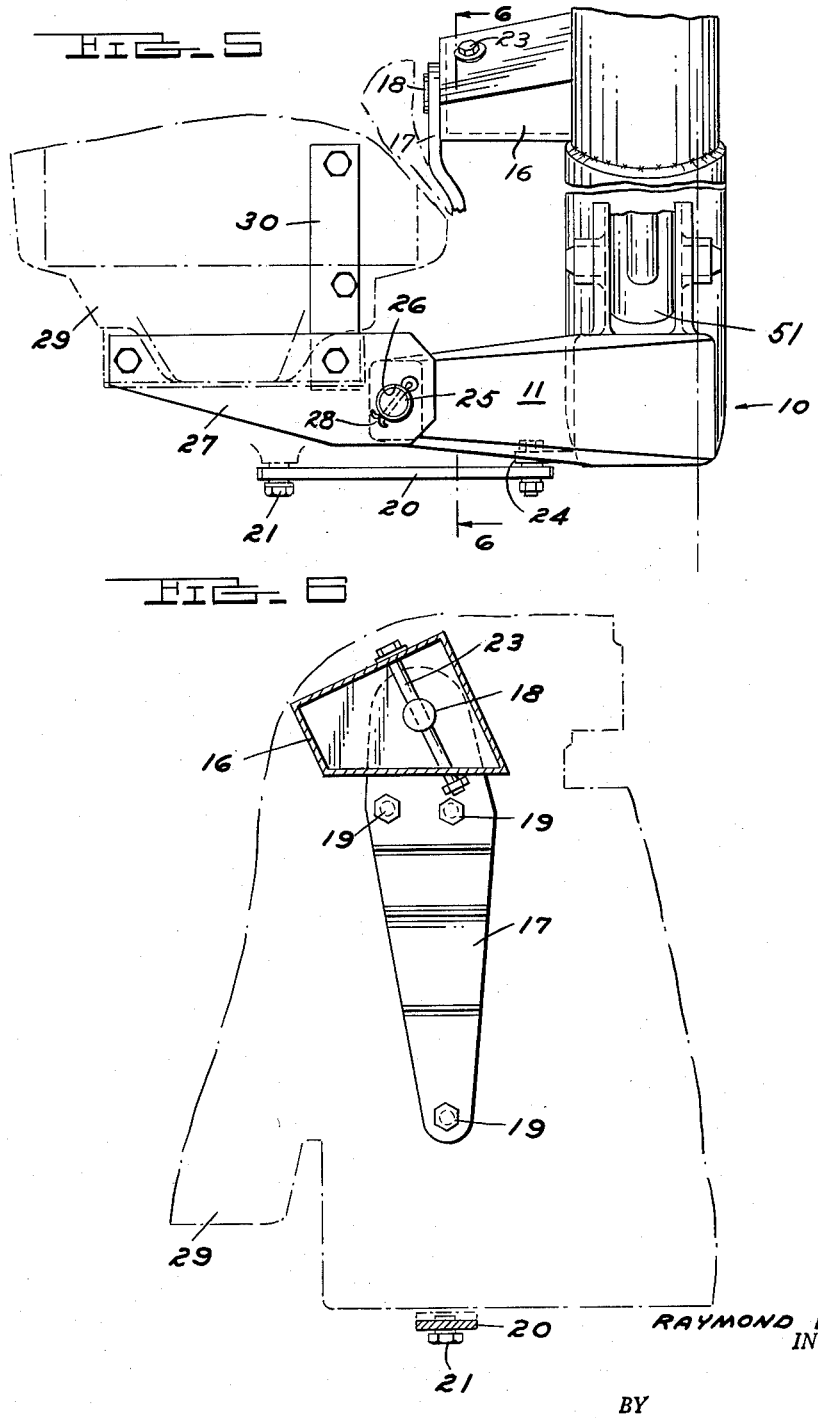

3,094,230
TRACTOR MOUNTED LOADER
Raymond W. Wilson, Washington, Mich., assignor to Ford Motor Company, Dearborn, Mich., a corporation of Delaware
Filed Nov. 6, 1959, Ser. No. 851,282
5 Claims. (Cl. 214—140)

This invention relates to loaders suitable for mounting on agricultural and general purpose wheel-type tractors.

Tractor-mounted loaders usually consist of a frame secured to the tractor, a boom pivotally mounted on the frame and a bucket pivotally mounted on the boom and capable of being swung to dumping position. The boom is raised and lowered and often the tilt of the bucket is controlled by hydraulic cylinders which may be connected either to the hydraulic system of the tractor or operated by an independent hydraulic system of the loader. In the usual loader organization, the loader frame is located symmetrically on both sides of the tractor, the two frame sides being interconnected, and the boom has side members on each side of the tractor pivotally connected to the frame members at each side of the tractor, the bucket extending between the side members of the boom.

In the loader of the present invention, a single frame member is mounted on one side of the tractor, the frame member being of new and simplified design and connected to the tractor at three spaced points in a manner to minimize loading on the tractor. The boom, which comprises a single member, is located adjacent one side of the tractor and, when lowered, moves downwardly along one side of the tractor engine. The bucket is laterally offset from the boom, being disposed towards the longitudinal center line of the tractor so as to provide a righting movement resisting tipping the tractor sideways and also to locate one end of the bucket generally along the line of the outside of the tractor wheels.

Among the objects of the present invention are to provide a tractor-mounted loader having an improved frame and boom design; to provide such a loader having an improved attachment to the tractor whereby loading of the tractor body is reduced; to provide such a loader which is durable and economical; and generally to improve loaders of the type described.

Other objects, and objects relating to details on economies of construction and use will be more apparent from the detailed description to follow:

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

FIGURE 1 is a somewhat diagrammatic side elevation of the tractor and loader, the left front wheel of the tractor being omitted and the loader being shown in full line in lowered position and being shown in broken line in raised position.

FIGURE 2 is a top plan view of the tractor and loader, portions of the tractor being omitted for convenience of illustration and portions of the loader boom and frame being broken away.

FIGURE 3 is a front elevation of the tractor and loader, the tractor being indicated by broken lines.

FIGURE 4 is a vertical cross-section of the bucket latch, taken generally on line 4—4 of FIGURE 3.

FIGURE 5 is an enlarged front elevation of the lower portions of the loader frame and adjacent portions of the engine, showing attachment of the frame to the tractor.

FIGURE 6 is a vertical cross-section taken through two of the attaching points of the loader to the tractor, taken on line 6—6 of FIGURE 5.

The loader of the present invention is adapted for mounting on tractors of the unitary type in which there is no separate tractor frame, but the crankcase of the engine, the clutch and transmission housing and the center housing and rear axle housings form the body of the tractor and support the front axle and rear wheels. The loader is shown mounted on the well known Ford four wheel tractor, but is equally applicable to the Ford tricycle and convertible front end models and to other tractors of the unitary type. The loader preferably is actuated hydraulically by the built-in hydraulic system in the tractor which has a conventional connection for operating a remote hydraulic cylinder.

The loader of the present invention has a generally L-shaped frame 10, including a generally horizontal, forwardly extending, leg 11 and a vertically extending leg 12 which preferably is forwardly inclined and terminates at about the top of the tractor sheet metal 14. The horizontal leg 11 of the frame is inwardly inclined towards the center of the tractor. Preferably, the horizontal and vertical legs 11 and 12 of the frame are interconnected by a cast or forged frame portion 15 at the intersection of the legs.

The frame 10 is attached to the tractor adjacent the lower end of the vertical leg 12 by a laterally projecting frame portion 16 fixed to the frame and detachably connected with a mounting pad 17 which is secured to the side of the tractor. Preferably, the mounting pad 17 is secured by bolts 19 threadedly engaged with the body of the tractor. The mounting pad 17 has a portion 18 telescopically receiving the frame portion 16, and a transversely extending bolt 23 holds these parts in assembled relation.

Most tractors are provided with implement attaching connections consisting of threaded holes on the sides of and the underside of the tractor at the forward portion of the clutch and transmission housing to facilitate the mounting of the implements on the tractor, and the side holes may be used for mounting the pad 17 on the tractor. The mounting pad 17 receives the principal load transmitted to the frame 10 in operation of the loader.

A strap 20 extending laterally from the underside of the frame adjacent the rear end of the horizontal leg 11 is connected with the underside of the tractor body. The strap 20 may be secured to the tractor body by a bolt 21 which is received within a threaded hole on the underside of the tractor body customarily provided to facilitate mounting of implements. The frame end of the strap 20 preferably is secured to the frame 10 by a bolt 22 holding the strap to a laterally projecting portion 24 of the frame portion 15. The strap 20 acts in both tension and compression to prevent lateral tilting of the frame 10 of the loader about the mounting point of the mounting pad 17.

The horizontal leg 11 of the frame terminates in a forwardly extending cylindrical or pin portion 25 which is received within a hole 26 in a plate 27 secured to the forward end of the tractor engine 29 and forming the third point for mounting the loader frame on the tractor. The plate 27 extends transversely at the front of the engine 29, and a vertically extending plate 30, also bolted to the engine, aids in supporting the plate 27 therefrom. A removable transverse pin 28 extending through the portion 25 in front of the plate 27 aids in holding these parts in assembled relation.

A boom 31, which preferably comprises a straight, tubular member, is mounted for vertical swinging movement on a horizontal pivot 32 mounted on the upper end of the vertical leg 12 of the frame 10 and extending transversely of the tractor. The boom 31 swings in the same general plane as the vertical leg 12 of the frame and extends forwardly beside the tractor, preferably being located in a plane between the tractor engine and front wheel as indicated in FIGURE 2.

A bucket 34, which may be of generally conventional design, is pivotally mounted for vertical swinging movement on the front end of the boom 31. Preferably, the bucket mounting comprises a transverse member 35 fixed to the front end of the boom 31 and a pair of forwardly-extending, bucket-supporting members 36—36 fixed to the ends of the transverse member. The bucket 34 is pivotally supported from the members 36—36 by a pair of aligned bolts 37—37 extending through the end walls of the bucket. If desired, the bucket may be provided with a plurality of tines 39 which may decrease in length from the center one in a customary manner.

In order to stabilize the tractor against overturning, the bucket 34 is disposed towards the longitudinal center line of the tractor, the center of the bucket being offset from the line of the boom 31, as indicated in FIGURE 2. In this manner, the moment tending to overturn the tractor to the left and produced by the weight of the loader and load in the bucket is largely counteracted by a righting moment caused by the offset bucket and tending to counteract the first moment. Preferably, the left end of the bucket is generally aligned with the outside surface of the left wheel of the tractor as shown in FIGURE 2. To aid in supporting the bucket 34 in its offset position, a diagonal brace 40 extends from an intermediate portion of the boom 31 to the right end portion of the transverse member 35 (see FIGURE 2).

Tripping of the bucket to dump the load is controlled by a latch mechanism including a latching lever 41 pivotally mounted on a pair of ears 42 fixed to the transverse member 35 a short distance to the right of the forward end of the boom 31. A transversely extending roller 44 carried by the lever is received within a slot 45 located in a latch plate 46 mounted on the bucket. A spring 47 biases the lever 41 counter-clockwise as viewed in FIGURE 4 to urge the lever into latching position.

An operating rod 49 extends along the boom 31 from an end of the latching lever 41 and terminates adjacent the steering wheel of the tractor to permit the operator to rotate the latching lever to unlatching position in order to dump the bucket. A lever 48, pivotally mounted on the boom 31 serves to operate the rod 49 for tripping the latching lever 41. In accordance with usual practice, the center of balance of the bucket in relation to its pivot is such that, after the bucket has tilted forward to release its load, a cam surface 50 on the latch plate 46 will, upon return swing of the bucket, strike the roller 44 and displace the latching lever 41, the bucket continuing to swing until the roller again falls within the slot 45 to relatch the bucket.

A single-acting hydraulic cylinder 51 extends between the frame 10 adjacent the intersection of the horizontal and vertical legs 11 and 12 and the intermediate portion of the boom 31. Preferably, one end of the cylinder is pivoted to the frame portion 15 and the other end of the cylinder is pivoted to a pair of parallel flanges 52—52 extending a substantial distance along boom 31. A hydraulic hose 54 extends from the cylinder 51 to a remote cylinder connection, not shown, provided on the tractor. The arrangement is such that hydraulic actuation of the cylinder 51 extends the cylinder so as to raise the loader, and release of the hydraulic fluid back into the tractor hydraulic system permits the loader to drop to lowered position.

The L-shaped frame 10 and method of mounting the frame on the tractor permits the frame to be mounted on a number of tractors by making minor changes in the mounting pads alone. For example, the loader of the present invention may be mounted on the Ford tricycle tractor and four-wheel conversion of the tricycle tractor, both of which have higher ground clearance, merely by rotating the frame 10 counter-clockwise slightly on the tractor so as to incline the vertical leg 12 of the frame to a slightly greater degree, thus permitting the bucket 34 to be lowered to ground level. Further, forward inclination of the vertical leg 12 of the frame permits use of the mounting points provided on the side of the tractor provided for mounting of implements and also permits the economy of a straight boom while providing adequate lift height of the bucket from a lowered position generally level with the surface on which the tractor is supported.

Preferably, the mounting pad 17 and the plates 27 and 30 are left in position on the tractor at all times. In order to mount the loader on a tractor, the assembled loader may be supported on a chain hoist or by jacks from below, and the forward portion 25 engaged within the hole 26 of the plate 27. Then, the portion 16 of the frame is telescoped over a portion 18 of the mounting pad, adjusting the height of the loader frame 10 on the tractor if necessary. Mounting of the loader is completed by insertion of the bolt 23 and the pin 28 and connecting the strap 20. Upon connecting the hydraulic hose 54 to the remote cylinder connection of the tractor, the loader is ready to operate.

I claim:

1. A tractor of the unitary type including an engine, clutch and transmission housing, and center housing of the rear axle, said elements connecting and supporting the front and rear axles of the tractor, the forward end of the clutch and transmission housing being provided with implement mounting connections at the sides and underside thereof, a rigid, integral, L-shaped loader frame mounted on one side of the tractor beside the engine, said frame having a forwardly extending lower leg inclined inwardly towards the engine and the forward end of the lower leg being supported from the forward end of the engine, and the other leg of the frame projecting upwardly adjacent the rear end of the engine and being supported from the implement connection at one side of the clutch and transmission housing, and a third support extending from the frame adjacent to the intersection of the legs thereof to the implement connection on the underside of the clutch and transmission housing to support the lower portion of the frame against lateral movement, a forwardly extending boom pivotally mounted for vertical swinging movement on the top of the vertically extending leg of the frame, and a hydraulic cylinder extending between the frame and an intermediate portion of the boom, the frame and cylinder being the sole support for the boom.

2. A tractor of the unitary type having a body including an engine, clutch and transmission housing, and center housing of the rear axle, said elements connecting and supporting the front and rear axles of the tractor, a rigid, integral L-shaped loader frame mounted on one side of the tractor beside the engine, said frame having a forwardly extending lower leg inclined inwardly towards the engine and the forward end of the lower leg being supported from the forward end of the engine, and the other leg of the frame projecting upwardly adjacent the rear end of the engine and being supported from the tractor body at the forward end of the clutch and transmission housing, and a third support extending from the frame adjacent to the intersection of the legs thereof to the underside of the forward end of the clutch and transmission housing to support the lower portion of the frame against lateral movement, a forwardly extending boom pivotally mounted for vertical swinging movement on the top of the vertically extending leg of the frame, and a hydraulic cylinder extending between the frame and an intermediate portion of the boom, the frame and cylinder being the sole support for the boom.

3. A loader for mounting on a wheel-type tractor having a longitudinally extending engine adjacent the front of the tractor, said loader having a single, rigid, integral, L-shaped frame adapted to be secured to one side of the tractor and including a generally horizontal, forwardly extending leg and a vertically extending, forwardly inclined leg, means adapted for connection with the tractor adjacent the front and rear ends of the engine for mounting the forwardly extending leg beside the tractor engine with the forward end of said leg adjacent the front end of the engine and the rear end of the leg adjacent the rear end of the engine, a forwardly extending boom pivotally mounted for vertical swinging movement on the top of the vertically extending leg of the frame, the pivotal mounting of the boom being located above the midportion of the forwardly extending leg, a hydraulic cylinder extending between the frame and an intermediate portion of the boom, and a bucket pivotally mounted for vertical swinging movement on the forward end of the boom, the frame and hydraulic cylinder being the sole support for the boom.

4. A loader for mounting on a wheel-type tractor having a longitudinally extending engine adjacent the front of the tractor, said loader having a single, rigid, integral L-shaped frame adapted to be secured to one side of the tractor and including a generally horizontal, forwardly extending leg and a vertically extending, forwardly inclined leg, the forwardly extending leg being adapted for mounting beside the tractor engine with the forward end of said leg supported from a bracket mounted at the front end of the engine and the rear end of the leg supported from a bracket mounted adjacent the rear end of the engine, a forwardly extending boom pivotally mounted for vertical swinging movement on the top of the vertically extending leg of the frame, the pivotal mounting of the boom being located above the midportion of the forwardly extending leg, a hydraulic cylinder extending between the frame and an intermediate portion of the boom, and a bucket pivotally mounted for vertical swinging movement on the forward end of the boom, the frame and hydraulic cylinder being the sole support for the boom.

5. A tractor of the unitary type including an engine, clutch and transmission housing, and center housing of the rear axle, said elements connecting and supporting the front and rear axles of the tractor, the forward end of the clutch and transmission housing being provided with implement mounting connections at the sides thereof, and a rigid, integral, L-shaped loader frame mounted on one side of the tractor beside the engine, said frame having a forwardly extending lower leg inclined inwardly towards the engine and the forward end of the lower leg being supported from the forward end of the engine, and the other leg of the frame projecting upwardly adjacent the rear end of the engine and being supported from the implement connection at one side of the clutch and transmission housing, a forwardly extending boom pivotally mounted for vertical swinging movement on the top of the vertically extending leg of the frame, and a hydraulic cylinder extending between the frame and an intermediate portion of the boom, the frame and the cylinder being the sole support for the boom.

References Cited in the file of this patent

UNITED STATES PATENTS

| 1,725,201 | Lessman | Aug. 20, 1929 |
| 2,436,723 | Machin | Feb. 24, 1948 |
| 2,638,235 | Pokorny | May 12, 1953 |
| 2,679,326 | Isaken | May 25, 1954 |
| 2,741,378 | Wagner | Apr. 10, 1956 |
| 2,779,491 | McNeice | Jan. 29, 1957 |

FOREIGN PATENTS

| 152,334 | Sweden | Nov. 8, 1955 |